Aug. 17, 1948.   M. V. THORNTON   2,447,144
OIL PURIFIER
Filed July 6, 1946
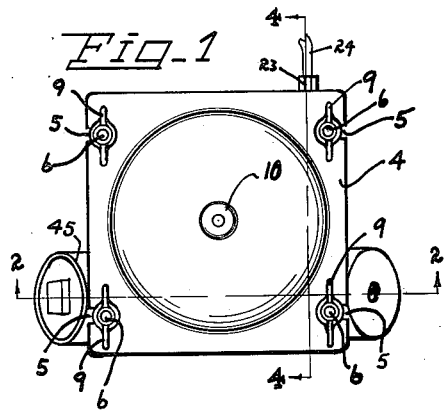
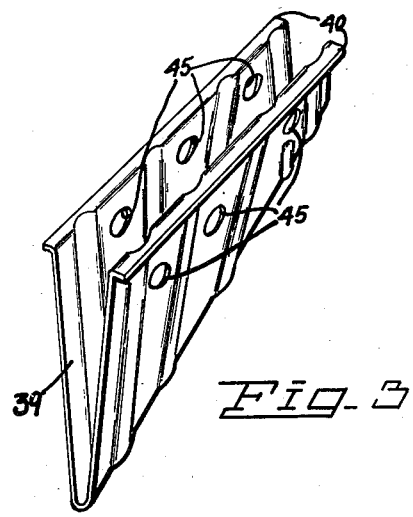
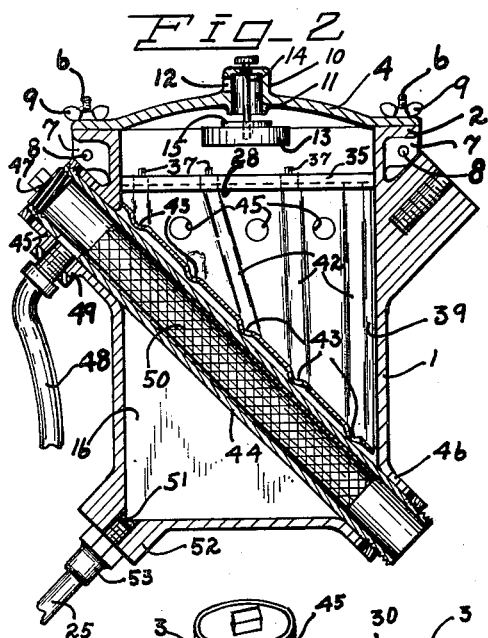
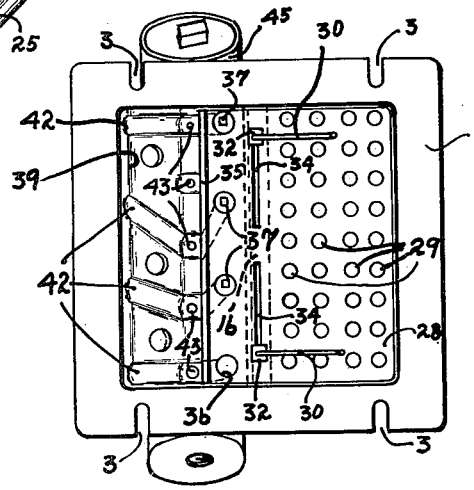
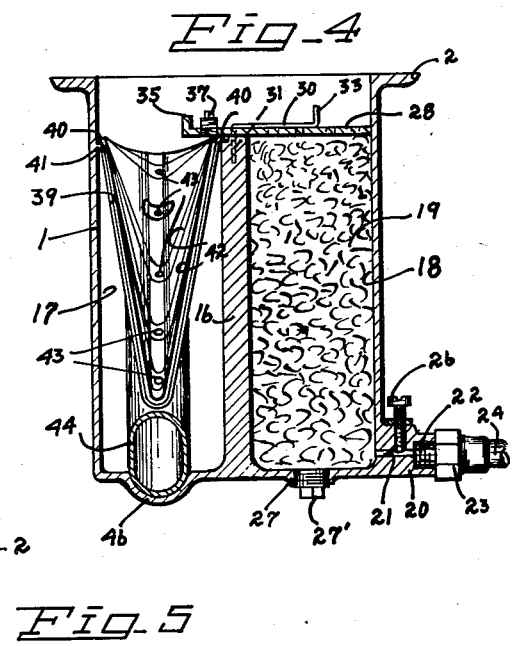
INVENTOR.
Marion V. Thornton
BY
ATTORNEY.

Patented Aug. 17, 1948

2,447,144

UNITED STATES PATENT OFFICE 2,447,144

OIL PURIFIER

Marion V. Thornton, Spokane, Wash.

Application July 6, 1946, Serial No. 681,722

7 Claims. (Cl. 210—150.5)

This invention relates to an oil filter or purifier and it is one object of the invention to provide a device of this character adapted to be mounted as an attachment for the engine of a motor vehicle and cause dirt, water, and other impurities to be removed from the lubricating oil.

Another object of the invention is to provide a purifier wherein incoming oil is passed through filtering material in order to remove dirt and the oil then heated so that water and other liquid impurities will be vaporized and pass off through an outlet at the top of the filter casing.

Another object of the invention is to provide a filter wherein the oil is delivered to the heater by way of a trough mounted over a diagonally extending tube through which hot exhaust gases from the engine pass, the trough being formed with openings in its bottom through which oil passes onto the heater tube and oil being delivered to the trough by a plate formed with openings adapted to be selectively closed so that the distance oil will flow along the heater tube may be controlled.

Another object of the invention is to provide a filter so formed that it may be thoroughly cleaned very easily when necessary and then reassembled.

Another object of the invention is to provide a filter which is simple in construction and efficient in operation.

The invention is illustrated in the accompanying drawings wherein:

Fig. 1 is a top plan view of the improved filter.

Fig. 2 is a sectional view taken vertically along line 2—2 of Figure 1.

Fig. 3 is a perspective view of a trough forming part of the filter.

Fig. 4 is a vertical sectional view taken along line 4—4 of Figure 1.

Fig. 5 is a top plan view with the cover removed.

The filter or purifier has a casing 1 which is preferably of greater depth than width and has its upper end open and surrounded by a flange 2 in which slots 3 are formed so that when a cover 4 formed with corresponding slots 5 is applied with its marginal portions resting upon the flange bolts 6 which are pivotally mounted between ears 7 by pins 8 may be swung upwardly through the registering slots and the winged nuts 9 of the bolts tightened to securely hold the cover in place, but allow the cover to be released and removed when necessary. The cover is substantially dome-shaped, as shown in Figure 2, and at its center is formed an upstanding boss 10.

The boss 10 is hollow to form an outlet 11 having a side port 12, and in order to permit the outlet to be closed, in case oil in the casing rises to such an extent that it would escape through the outlet, a float 13 is suspended under the cover by a stem 14 and carries a valve disk 15 which closes the outlet when the float is moved upwardly. Ordinarily the float valve remains in its opened position shown in Figure 2 and vapors rising in the casing may escape.

A partition 16 which extends vertically in the casing divides it into chambers 17 and 18, the chamber 18 being filled with filtering material 19 serving to remove dirt from oil flowing upwardly through the filter chamber. A boss 20 formed with an inlet opening or passage 21 extends from the casing at the bottom of chamber 18, and at its outer end is formed with a threaded socket 22 to receive a coupling 23 by means of which a tube or pipe 24 is connected with the filter. Oil from the engine flows through the pipe 24 to the filter and clean oil is delivered from the filter through pipe 25. A screw or needle valve 26 carried by the boss 20 controls flow of oil through passage 21 into chamber 18. A drain opening 27 is formed through the bottom of the chamber 18 and when the plug 27' is removed dirt may be flushed out of the chamber after the filtering material 19 has been removed and the chamber thoroughly cleaned.

The upper end of the chamber 18 is closed by a plate 28 through which rows of openings 29 are formed, and this plate rests upon the upper edge face of the partition 16 and is secured by the bars 30. The bars have depending threaded shanks 31 at their inner ends which are screwed into threaded sockets formed in bosses or lugs 32 projecting upwardly from the partition and free ends of the bars are bent upwardly to form finger holds 33 so that they may be grasped and turned into and out of the securing position shown in Figures 4 and 5. When the bars are turned to a releasing position they are disposed over slots 34 formed through the plate and leading from the openings formed through which the lugs 32 pass and the plate may then be drawn upwardly out of covering relation to the filtering chamber. Oil which has passed upwardly through the filtering chamber flows along the upper surface of the chamber toward the side edge thereof which is guarded by an upstanding flange 35. A number of openings 36 are formed through the portion of the plate which projects from the partition and in order to close all but one of these openings there have been provided plugs 37 which are screwed into the opening. By transferring a plug from one opening to another the point at which oil will flow through the plate may be controlled.

Oil which flows through the projecting side portion of the plate 28 enters a trough 39. This trough is V-shaped in cross section and its side walls have upper portions bent to form flanges 40 which rest upon the partition 16 and upon a flange or lugs 41 projecting inwardly from a side wall of the casing. The trough gradually increases in depth toward one end and at points spaced from each other longitudinally of the trough the side walls of the trough are crimped to form grooves or channels 42 having portions crossing the bottom of the trough and formed with openings 43 through which oil may leave the trough and oil flowing through the openings 43 lands upon a heating pipe 44 and as it flows downwardly along this pipe the hot pipe will cause water, or other liquid impurities in the oil to be converted into vapor which passes upwardly in chamber 17 at opposite sides of the trough and through openings 45 into the upper portion of the casing from which it flows outwardly through the outlet 11 and discharge port 12. The boiling point of water and other liquid impurities in the oil is lower than the boiling point of the oil itself and therefore the water and other liquid impurities may be driven off while the oil is still in a liquid state. By transferring plugs from one opening 36 to another the point at which the oil flows from the plate 28 and into the trough may be controlled and the distance the oil flows along the hot pipe 44 regulated. During cold weather the opening 36 over the upper end of the trough will be left open so that the oil will enter the upper groove or channel 42 and flow along the hot pipe for substantially the entire length thereof and as the temperature rises the plugs will be shifted until during hot weather the oil will flow through the opening 43 nearest the lowest end of the trough and only flow along the hot pipe a short distance. End portions of the pipe 44 fit tightly into sleeves 46 and 46' projecting from opposite walls of the casing near the top and the bottom of the chamber 17, the upper end of the pipe being closed by a plug 47 and the lower end of the pipe projecting from the sleeve 46' so that it may be connected with the exhaust pipe of an engine. The hot exhaust gases flow upwardly through the pipe 44 and escape through a pipe 48 mounted in an opening formed through a boss 49 at a side of the upper sleeve 45 and in order to prevent carbon from gathering upon walls of the pipe there has been provided a tubular screen 50. Oil flows or drips from the hot pipe 44 into the chamber 17 and this oil, which has been cleaned and purified, flows from the filter through the pipe 25 which is secured in communication with the outlet 51 formed in the boss 52 by a coupling 53. If oil gathers in the chamber 17 faster than it flows out through pipe 25 and its level reaches the upper portion of the casing above the chambers 17 and 18 the float 13 will be shifted upwardly and the gasket 15 will close the outlet 11 and prevent loss of oil. By removing the cover 4 the plate 28 may be lifted out of place and the trough 39 and the filtering material removed and the filter thoroughly cleaned and when the plug 47 is removed the screen 50 may be withdrawn and cleaned and then replaced or a new screen thrust into the heating pipe.

Having thus described the invention, what is claimed is:

1. A filter comprising a casing, a removable cover for the upper end of said casing, a partition dividing the casing into a filter chamber and heating chamber, filtering material in the filter chamber, a perforated plate closing the upper end of the filter chamber and releasably secured upon the partition with a portion overhanging the heating chamber and formed with an upstanding marginal flange and with openings spaced from each other longitudinally of the flange, there being an oil inlet at the bottom of the filter chamber adapted for connection with an oil pipe extending from an engine, a heater pipe extending diagonally in the heater chamber between upper and lower sleeves projecting from the casing, a removable plug closing the outer end of the upper sleeve, said heater pipe passing through the lower sleeve and adapted for connection with the exhaust pipe of an engine, a discharge pipe for exhaust gases leading from the upper sleeve, a pipe connected with the bottom of the heater chamber for returning clean oil from the heater chamber to an engine, a tubular screen in said heater pipe, a trough in the heater chamber over said heater pipe V-shaped in cross section and gradually increasing in depth toward one end and following the incline of the heater pipe, a side wall of the trough being formed with a flange disposed under the projecting portion of said plate whereby oil flowing through openings in the plate will enter the trough, walls of the trough being formed with channels disposed under the openings in the plate and having portions crossing the bottom of the trough and formed with outlet openings through which oil flows onto the heater pipe, removable closures for the openings in the plate, the side walls of the trough being formed with openings through which vapors rising from the heater pipe may flow upwardly into the portion of the casing above the chambers, said cover being formed with an outlet for vapors, and a float valve for closing the vapor outlet and preventing escape of oil through the vapor outlet.

2. An oil filter and purifier comprising a casing open at its top and partitioned vertically to provide a filter chamber and a heater chamber, there being an oil inlet at the bottom of the filter chamber and an oil outlet at the bottom of the heater chamber, filtering material in the filter chamber, a cover for the upper end of the casing formed with a vapor outlet controlled by an outwardly closing float valve in the casing, a perforated plate covering the upper end of the filter chamber and having a portion projecting across the partition and formed with openings and with an upstanding marginal flange, a heater pipe in the heater chamber disposed at a vertical incline and adapted to be heated by hot exhaust gases of an engine, and a trough in the heater chamber over the heater pipe and having a side wall disposed under the projecting portion of the perforated plate whereby oil flowing through an unobstructed opening in the projecting portion of the plate may enter the trough, removable plugs for closing selected ones of the openings in the projecting plate, the trough being formed with internal channels extending vertically under the openings of the projecting portion of the plate with portions extending across the bottom of the trough and formed with openings for flow of oil from the trough onto the heater pipe at predetermined distances from the lower end thereof, and said trough being formed with openings between the channels for flow of vapors upwardly into the portion of the casing above the chambers and out through the vapor outlet.

3. An oil filter and purifier comprising a casing divided by a vertical partition into a filter chamber and a heater chamber, there being an oil inlet at the bottom of the filter chamber and an oil outlet at the bottom of the heater chamber, a removable cover for the casing spaced upwardly from the partition and provided with a vapor outlet controlled by an upwardly closing float valve, a heater pipe in the heater chamber adapted to be connected with the exhaust pipe of an engine and heated by hot exhaust gases flowing through the pipe, filtering material in the filter chamber, a trough in the heater chamber above the pipe formed internally with vertically extending channels leading to openings formed through the bottom of the trough for flow of oil from the trough onto the pipe, a plate extending from the partition in overhanging relation to a side of the upper portion of the trough and formed with openings disposed over the channels, and removable closures for the openings in the plate whereby oil may be caused to be delivered into predetermined channels and caused to flow from the trough and onto the pipe at a predetermined distance from an end of the pipe.

4. An oil filter and purifier comprising a casing divided by a vertical partition into a filter chamber and a heater chamber, there being an oil inlet at the bottom of the filter chamber and an oil outlet at the bottom of the heater chamber, filtering material in the filtering chamber, a heater pipe in the heater chamber disposed at a vertical incline and adapted to be heated by exhaust gases of an engine passing through the pipe, a cover for said casing having a vapor outlet normally open and controlled by a float valve movable upwardly to a closed position, a trough in the heater chamber having a bottom extending along the heater pipe and formed with openings spaced from each other longitudinally of the heater pipe for delivering oil onto the pipe at predetermined distances from the lower end of the heater pipe, and means for controlling flow of oil from the filter chamber into the trough.

5. An oil filter and purifier comprising a casing divided by a vertical partition into a filter chamber and a heater chamber, there being an oil inlet at the bottom of the filter chamber and an oil outlet at the bottom of the heater chamber, filtering material in the filtering chamber, a heater pipe in the heater chamber disposed at a vertical incline and adapted to be heated by exhaust gases of an engine passing through the pipe, a trough in the heater chamber over said pipe having outlet openings spaced from each other longitudinally of its bottom, and means for delivering oil from the filter chamber into the trough in cooperating relation to predetermined outlet openings of the trough.

6. An oil filter and purifier comprising a casing divided by a vertical partition into a filter chamber and a heater chamber, there being an oil inlet at the bottom of the filter chamber and an oil outlet at the bottom of the heater chamber, filtering material in the filtering chamber, a heater pipe in the heater chamber disposed at a vertical incline and adapted to be heated by exhaust gases of an engine passing through the pipe, a perforated plate covering the filter chamber and resting upon the upper edge of the partition with a portion overhanging the heater chamber, lugs projecting upwardly from the partition through the plate, the plate being formed with slots extending from openings through which the lugs pass, bars pivotally carried by the lugs and movable from a securing position in which they bear upon the plate to a position in which they extend along the slots and allow removal of the plate, a trough in the heater chamber overhung by the projecting portion of the plate, and means for selectively controlling flow of oil from the plate into the trough.

7. An oil filter and purifier comprising a casing divided by a vertical partition into a filter chamber and a heater chamber, there being an oil inlet at the bottom of the filter chamber and an oil outlet at the bottom of the heater chamber, filtering material in the filtering chamber, a heater pipe in the chamber disposed at a vertical incline and adapted to be heated by exhaust gases of an engine passing through the pipe, a perforated plate covering the filter chamber and resting upon the upper edge of the partition with a portion overhanging the heater chamber, and means for selectively controlling flow of oil from the plate into the heater chamber and depositing the oil onto the pipe at predetermined distances from the lower end of the pipe.

MARION V. THORNTON.

REFERENCES CITED

The following references are of record in the file of this patent:

UNITED STATES PATENTS

| Number | Name | Date |
|---|---|---|
| 2,206,358 | Koinzan | July 2, 1940 |
| 2,377,988 | Braun | June 12, 1945 |
| 2,388,821 | Braun | Nov. 13, 1945 |